(12) United States Patent
Doh et al.

(10) Patent No.: US 8,091,618 B2
(45) Date of Patent: *Jan. 10, 2012

(54) EXCHANGE APPARATUS

(75) Inventors: Cha P. Doh, Sudbury, MA (US);
Kwok-Shun Cheng, Nashua, NH (US);
Alicia Briggs LaForge, Staten Island, NY (US)

(73) Assignee: Entegris, Inc., Billerica, MA (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/981,082

(22) Filed: Oct. 31, 2007

(65) Prior Publication Data

US 2008/0135219 A1 Jun. 12, 2008

Related U.S. Application Data

(63) Continuation of application No. 10/489,214, filed as application No. PCT/US02/30493 on Sep. 26, 2002, now Pat. No. 7,308,932.

(60) Provisional application No. 60/326,234, filed on Oct. 1, 2001.

(51) Int. Cl.
*F28D 7/10* (2006.01)
*F28F 9/02* (2006.01)
*F28D 7/02* (2006.01)

(52) U.S. Cl. ........ 165/158; 165/157; 165/163; 165/905; 29/890.03; 29/890.037; 29/890.043

(58) Field of Classification Search .................. 165/138, 165/157, 158, 163, 905, 200; 29/890.03, 29/890.033, 890.037, 890.043
See application file for complete search history.

(56) References Cited

U.S. PATENT DOCUMENTS

| | | |
|---|---|---|
| 3,616,828 A | 11/1971 | Rosenblatt |
| 3,963,622 A | 6/1976 | Baudet et al. |
| 4,175,153 A | 11/1979 | Dobo et al. |
| 4,271,900 A | 6/1981 | Reitz |
| 4,291,096 A | 9/1981 | Taylor |
| 4,411,307 A | 10/1983 | Ecker |
| 4,867,233 A | 9/1989 | Gemeinhardt |
| 4,923,004 A | 5/1990 | Fletcher et al. |
| 5,066,397 A | 11/1991 | Muto et al. |
| 5,469,915 A | 11/1995 | Cesaroni |
| 5,499,676 A | 3/1996 | Cesaroni |
| 5,582,238 A | 12/1996 | Plaschkes |
| 6,001,291 A | 12/1999 | Cesaroni |

(Continued)

FOREIGN PATENT DOCUMENTS

EP 0193946 9/1986

(Continued)

*Primary Examiner* — Ljiljana Ciric
(74) *Attorney, Agent, or Firm* — John E. Pillion

(57) ABSTRACT

An exchange apparatus comprised of hollow perfluorinated thermoplastic tubes fusion bonded into a perfluorinated thermoplastic material to form unified terminal end blocks is disclosed. The hollow tubes are shaped by plaiting the tubes into cords and thermally annealing the cords to set the bends of the plait. The apparatus can have a housing bonded to the unified terminal end blocks. In use a first fluid enters the hollow tubes at openings in a first unified terminal end block, flows through the lumens of the tubes, and exits the tubes through a second unified terminal end block. A second fluid enters the housing, is separated from the first fluid by the wall of the tubes, and substantially fills the space between the inner wall of the housing and the outer diameters of the hollow tubes. Energy is transferred between the first and second fluids through the tube walls.

11 Claims, 11 Drawing Sheets

U.S. PATENT DOCUMENTS

| | | | |
|---|---|---|---|
| 6,038,768 | A | 3/2000 | Rhodes |
| 6,039,084 | A | 3/2000 | Martucci et al. |
| 6,149,422 | A | 11/2000 | Cesaroni |
| 6,180,038 | B1 | 1/2001 | Cesaroni |
| 6,224,763 | B1 | 5/2001 | Feng et al. |
| 6,364,008 | B1 | 4/2002 | Mannoni et al. |
| 6,368,530 | B1 | 4/2002 | Adubato et al. |
| 6,805,731 | B2 | 10/2004 | Cheng et al. |
| 7,308,932 | B2 * | 12/2007 | Doh et al. .......... 165/138 |
| 2007/0144716 | A1 | 6/2007 | Doh et al. |

FOREIGN PATENT DOCUMENTS

| | | |
|---|---|---|
| EP | 0 213 157 B1 | 3/1987 |
| EP | 0 296 904 | 12/1988 |
| EP | 0 514 021 A1 | 11/1992 |
| EP | 1088792 A1 | 4/2001 |
| FR | 2587468 | 3/1987 |
| GB | 1040284 | 8/1966 |
| GB | 2273459 | 6/1994 |
| JP | 03-178668 | 8/1991 |
| JP | 61008404 | 8/1991 |
| JP | 2001-201121 | 7/2001 |
| WO | WO 00/44480 | 8/2000 |

* cited by examiner

SHELL

| Example | Shell Diameter (in) | Tube Style | Flow (ml/min) | Ti (C) | To (C) | Delta T |
|---|---|---|---|---|---|---|
| 1 | 1 | Straight | 1070 | 18.90 | 38.80 | 19.90 |
| 2 | 1 | Twisted | 1070 | 18.90 | 44.00 | 25.10 |

TUBE

| Example | Shell Diameter (in) | Tube Style | Flow (ml/min) | Ti (C) | To (C) | Delta T | Heat Exchange (Watts) |
|---|---|---|---|---|---|---|---|
| 1 | 1 | Straight | 1750 | 63.00 | 52.80 | 10.20 | 1485.54 |
| 2 | 1 | Twisted | 1650 | 54.80 | 41.30 | 13.50 | 1873.72 |

Figure 6

| Tube Side | | | | Shell Side | | |
|---|---|---|---|---|---|---|
| Flow Rate (ml/min) | Temp. In (C) | Temp. Out (C) | | Flow Rate (ml/min) | Temp. In (C) | Temp. Out (C) |
| 50 | 54.1 | 18.7 | | 1000 | 15.9 | 17.8 |
| 260 | 55.5 | 33.1 | | 1000 | 16.1 | 24.2 |
| 300 | 59.3 | 37.1 | | 1000 | 16 | 24.9 |

Figure 8

| HOT | | | | COLD | | |
| --- | --- | --- | --- | --- | --- | --- |
| Process Fluid Tube Side | | | | Working Fluid Shell Side | | |
| Inlet Temp (C) | Outlet Temp (C) | Flow Rate (L/min) | | Inlet Temp (C) | Outlet Temp (C) | Flow Rate (L/min) |
| 70.12 | 22.91 | 4.4 | | 14.54 | 46.50 | 6.6 |
| 69.80 | 23.95 | 4.4 | | 14.38 | 49.20 | 5.6 |
| 69.33 | 27.76 | 4.4 | | 14.31 | 55.43 | 4.1 |
| 68.89 | 31.47 | 4.4 | | 14.22 | 59.69 | 3.3 |
| 68.16 | 39.51 | 4.4 | | 14.04 | 64.84 | 2 |
| 67.30 | 23.06 | 4.4 | | 13.92 | 47.03 | 5.5 |
| 72.13 | 31.62 | 6.7 | | 10.04 | 61.27 | 6.5 |
| 73.03 | 24.02 | 5 | | 9.97 | 55.36 | 6.5 |
| 72.75 | 18.47 | 3.8 | | 9.96 | 48.45 | 6.5 |
| 72.05 | 13.91 | 2.9 | | 10.01 | 39.74 | 6.5 |
| 71.28 | 11.20 | 2.1 | | 9.99 | 31.21 | 6.5 |

Figure 9

EXCHANGE APPARATUS

RELATED APPLICATIONS

This application is a continuation of U.S. application Ser. No. 10/489,214 filed Mar. 10, 2004 now U.S. Pat. No. 7,308,932, Cha P. Doh et al which was the National Stage of International Application No. PCT/US2002/030493 filed Sep. 26, 2002, Cha P. Doh et al which claims the benefit of U.S. Provisional Application No. 60/326,234 filed Oct. 1, 2001, Cha P. Doh et al the contents of these are incorporated herein by reference in their entirety into the present application.

FIELD OF INVENTION

This invention relates to a hollow tube or hollow fiber membrane exchange apparatus useful for heat transfer, particle filtration, and mass transfer applications. The apparatus comprises a housing containing fusion bonded hollow tubes that have been previously plaited and thermally annealed to set the plait. The apparatus has a high packing density of hollow tubes with enhanced fluid flow distribution provided by the plaited hollow tubes. The apparatus provides high contacting area in a small volume without the need for baffles. The device is made from chemically inert thermoplastic materials and has the ability to operate at elevated temperatures with organic as well as corrosive and oxidizing liquids.

BACKGROUND

Hollow fibers and thin walled hollow tubes are commonly used in mass transfer, heat exchange, and cross flow particle filtration devices. In these applications the hollow tubes or fibers provide a high surface to volume ratio which permits a greater transfer of heat and mass in a smaller volume than a device made with flat sheet materials of similar composition.

A hollow fiber or a hollow tube comprises an outer diameter and surface, an inner diameter and surface, and a porous or non-porous material between the first and second surfaces or sides of the tube or fiber. The inner diameter defines the hollow portion of the fiber or tube and is used to carry one of the fluids. For what is termed tube side contacting, a first fluid phase flows through the hollow portion, sometimes called the lumen, and is maintained separate from a second fluid phase, which surrounds the tube or fiber. In shell side contacting, the first fluid phase surrounds the outer diameter and surface of the tube or fibers and the second fluid phase flows through the lumen. In an exchange apparatus, packing density relates to the number of useful hollow fiber or hollow tubes that can be potted in the apparatus.

Examples of applications in semiconductor manufacturing where heating of a liquid is required include sulfuric acid and hydrogen peroxide photoresist strip solutions, hot phosphoric acid for silicon nitride and aluminum metal etching, ammonium hydroxide and hydrogen peroxide SC1 cleaning solutions, hydrochloric acid and hydrogen peroxide SC2 cleaning solutions, hot deionized water rinses, and heated organic amine based photoresist strippers.

Cooling of heated liquids after use in a bath, especially photoresist stripping solutions, phosphoric acid, SC1 and SC2 cleaning solutions is necessary prior to disposing of the used chemical. Electrochemical plating baths and apparatus are sometimes maintained at sub-ambient temperatures.

On a wafer processing track apparatus, accurate and repeatable conditioning of the temperature of liquids such as spin on dielectrics, photoresists, antireflective coatings, and developers prior to dispense onto a wafer requires heating or cooling of these liquids.

Heat exchangers are devices which transfer heat from one fluid, the process fluid, and a second working fluid. Polymer based heat exchangers are used for heating and cooling chemicals for these applications due to their chemical inertness and resistance to corrosion. However, polymeric heat exchange devices are usually large because a high heat transfer surface area is required to effect a given temperature change due to the low thermal conductivity of the polymers used in the device. Braiding of the tubes is used prevent the tubes from becoming unevenly spaced when used in open container heat exchange applications. Such devices take up valuable space, requires large holdup volumes of chemicals or exchange fluid, and are costly to make. Such devices also require o-ring seals which are prone to failure and are also a source of ionic and particulate contamination.

Quartz heaters are also used to heat liquids used for semiconductor processing. Quartz is susceptible to breakage and exposed resistively heated surfaces pose fire and explosion hazards especially for organic liquids and liquids which evolve flammable gases.

Gas to liquid contactors or exchangers using hollow fiber tubes are used in semiconductor manufacturing to remove or to add gases to liquids. Commercially available gas to liquid contactors utilize baffles to improve mass transfer between the fluids. Typical applications for contacting membrane systems are to remove dissolved gases from liquids, "degassing", or to add a gaseous substance to a liquid. For example, a wet bench is a wafer processing apparatus where ozone gas is added to very pure water to be contacted with semiconductor wafers for cleaning and oxide growth.

Cross flow filtration is used in semiconductor manufacturing to remove suspended solids, such as abrasive particles used in chemical mechanical polishing slurries. A chemical mechanical slurry stream contains in addition to the solid slurry material, oxidizers like hydrogen peroxide in combination with acids and bases such as hydrochloric acid or ammonium hydroxide. A chemical mechanical polishing tool is an example of a wafer processing apparatus used in semiconductor manufacturing.

To effect cross flow filtration, mass transfer, or heat transfer using contactors made from hollow tubes or porous hollow fibers, baffling is commonly used to promote flow across the tubular elements. Various designs for baffling have been detailed in the literature which improve the transfer of heat and materials to the hollow tubes. U.S. Pat. No. 5,352,361 teaches the art of baffling for hollow fiber gas to liquid contactors. Such baffles are useful for polyethylene like hollow tubes where methods to pot and spin laminate baffles are easily implemented. Baffling of perfluronated tubes is not practical using this technique. U.S. Pat. No. 4,749,031 teaches baffling with perfluorinated baffles through which individual hollow tubes are threaded. It is cumbersome, and expensive to manufacture exchange contactors using this technique. U.S. Pat. No. 4,360,059 describes a spiral heat exchanger prepared from a cast material such as aluminum. Such a method does not contemplate the use of thermoplastics nor does it address the need for the substantially higher surface area required for low thermally conductive thermoplastic materials.

U.S. Pat. No. 3,315,740 discloses a method of bonding tubes together by fusion for use in heat exchangers. Tubes of a thermoplastic material are gathered in a manner such that the end portions of the tubes are in a contacting parallel relationship. The end portion of the gathered tubes is placed within a sleeve having a thermoplastic internal surface and being rigid relative to the tubes. A fluid heated to a temperature at least equal to the softening point of the thermoplastic material is introduced into the interiors of the end portions of the tubes. Then a pressure differential is imposed across the walls of the tubes so that the pressure within the tubes is greater than the pressure on the exterior surfaces of the tubes, thereby causing the tubes to be expanded and to be fused with the surfaces of the adjacent tubes. Such a method produces an irregular pattern of entrances to the hollows of the tubes effecting non-uniform flow distribution to the tubes. Such a method also requires relatively thick walled tubing to provide sufficient thermoplastic to form a seal with the housing sleeve. It is not contemplated to use such a potting method to form an end structure or a unified terminal end block, nor is it contemplated to braid the tubes and thermally set them prior to potting to provide enhanced flow distribution.

Canadian Patent 1252082 teaches the art of making spiral wound polymeric heat exchangers. Such a device requires mechanical fixtures to hold the tubes in place and as such requires a large volume of space.

U.S. Pat. Nos. 4,980,060 and 5,066,379 describe fusion bonded potting of porous hollow fiber tubes for filtration. The invention does not disclose the conditions required to effect fusion bonding of non-porous thermoplastic tubes for preparation of a unified terminal end block for use in phase and heat exchange. The invention does not contemplate twisting or braiding of the hollow fibers nor does it contemplate annealing the fibers prior to potting to effect a structure on the potted tubes for enhanced flow distribution.

Alan Gabelman and Sun-Tak Hwang in the Journal of Membrane Science, volume 159, pp 61-106, 1999 describe the importance of uniform fiber spacing for obtaining better mass transfer in hollow fiber contactors. The authors observe that hand built modules have more uniform fiber spacing but that the cost of such modules do not justify their higher manufacturing cost. Such arguments can be applied to hollow tube heat exchange and cross flow devices as well.

U.S. Pat. No. 5,224,522 describes a method and device for producing woven hollow fiber tapes for use in exchange devices such as blood oxygenators and heat exchangers. Such a device method requires expensive and complicated weaving equipment to fix the fibers in a preferred relationship in the tube mats.

Currently it is impractical to use thermoplastic heat exchangers for large heat loads, shell side liquid flow, or efficient shell side cross flow filtration because of the high expense and large size of devices needed. Metal heat exchangers are unacceptable for use in semiconductor manufacturing because of the corrosive nature of the chemicals and also because of the need to eliminate metallic and particulate impurities from process liquids. What is needed is a thermoplastic apparatus for heat exchange, mass transfer, or cross flow filtration with high surface area, uniform fiber spacing, and minimal volume. The apparatus should eliminate the need for baffles.

SUMMARY OF THE INVENTION

The present invention provides for an apparatus with high surface area useful in mass transfer, heat exchange, or cross flow particle filtration. The apparatus is constructed of thermoplastic materials and contains hollow thermoplastic fibers or hollow tubes fusion bonded into a thermoplastic resin to form a unified terminal block. Optionally, the apparatus including the unified terminal block is fusion bonded into a thermoplastic housing which has fluid inlet and fluid outlet connections for the process and working fluids to be contacted across the hollow fibers or hollow tubes. A manufacturing method for the apparatus is provided and described. A method of use of the apparatus is also provided and described.

In one embodiment the hollow tubes in the apparatus are braided, plaited, or twisted together to create a cord of the tubes or fibers prior to fusion bonding into the thermoplastic resin to form a unified terminal block. Such cords provide enhanced flow distribution of fluid through the apparatus without the need for baffling. A high packing density of hollow tubes or cords is achieved with this invention.

In another embodiment the cord containing the hollow tubes or fibers is annealed in an oven to set the shape of the twist, plait, or braid of the hollow tubes or fibers in place prior to the fusion bonding process. Alternatively, the hollow tube or cord can be wrapped around a rod, another hollow tube, or a template and the shape of the hollow tube or cord set by thermal annealing with the template. The braided or twisted cord can be wound on a rack and thermally annealed setting the cord's plait, geometry, and length. The braided or twisted cords are removed from the rack as a bundle of continuous cord which is then fusion bonded into a thermoplastic resin to form a unified terminal block. In an alternative embodiment, the annealed cord can be unwrapped to give individual non-circumferential hollow tubes or fibers. These individual hollow tubes are fusion bonded into a thermoplastic resin well as a bundle. Optionally, the annealed cord or individual non-circumferential hollow tubes or fibers in the unified terminal block are fusion bonded to a thermoplastic housing which has fluid inlet and fluid outlet connections for the process and working fluids to be exchanged by the apparatus.

BRIEF DESCRIPTION OF THE DRAWINGS

FIG. 6 is a table detailing the performance of the heat exchangers described in the Example 2 and Example 3.

FIG. 8 is a Table detailing the performance of a twenty tube heat exchanger described in Example 6.

FIG. 9 is a Table detailing the performance of a 680 tube heat exchanger described in Example 7.

DESCRIPTION OF SPECIFIC EMBODIMENTS

This invention relates to an apparatus for heat and mass transfer operations as well as other phase separation applications. The present invention also describes a method for making a unified terminal end block, fusion bonded exchange apparatus comprising braided or twisted thermoplastic hollow tubes or hollow fibers. A cord is referred to in the practice of this invention as one or more fibers and or tubes which have been twisted together, plaited, or braided to form a unit which can be potted or fused into a well of a thermoplastic resin by the method of this invention. The fusion bonding is performed with a thermoplastic polymer. While the present invention will be described with reference to non-porous poly(tetrafluoroethylene-co-perfluoromethylvinylether) hollow tubes, it is to be understood that the present invention can be made using a variety of thermoplastic tubes and or porous fiber membranes which will hereafter referred to in general as hollow tubes. Further, while the present invention is described with reference to twisted pairs of poly(tetrafluoroethylene-co-perfluoromethylvinylether) hollow tubes, it is to be understood that the present invention can be made using a variety of numbers of hollow tubes or hollow fibers which are twisted, woven, plaited, or braided to form what are hereafter referred to as cords. Finally, while the present invention is described with respect to an apparatus for heat exchange, similar devices utilizing porous hollow tubes or hollow fibers can be made for use in mass transfer and cross flow filtration applications.

For purposes of this invention, a single, un-wrapped annealed tube is considered a non-circumferential tube. Non-circumferential tubes are tubes with external dimensions that are not continuously circumferential on a longitudinal axis moving from one end portion of the tube to the other. Examples include, but are not limited to, a helical coil, a permanently twisted hollow circular tubing such as the single, unwrapped annealed fiber or a tube that is extruded in such condition, a triangular shaped tube or fiber, a rectangular shaped tube or fiber, or a square shaped tube or fiber.

The braid, plait, twist, or non-circumferential geometry of the hollow tubes or fibers provides for enhanced fluid distribution across and within the hollow tubes. The device provides high fluid contacting area in a small volume without the need for baffles. The unitary or unified terminal block construction of the apparatus with chemically inert materials of construction eliminates the need for O-rings and permits use of operation of the device at elevated temperatures and with a variety of fluids.

Figure 1:
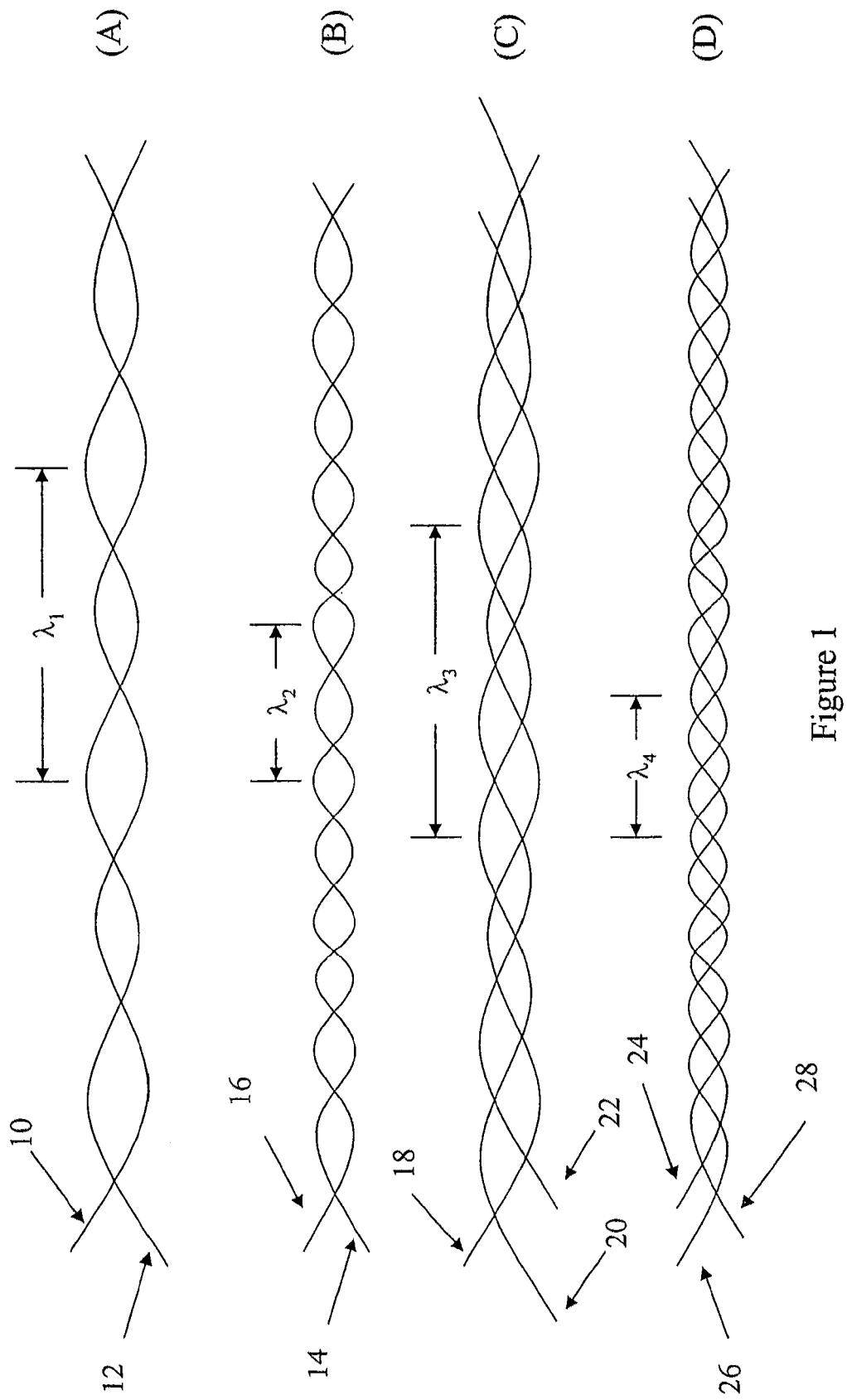
FIG. 1 (A-D) are schematic diagrams illustrating examples of a twisted and braided hollow tubes.

Two or more hollow tubes can be plaited, twisted or braided into a cord manually or by use of commercially available winding and braiding equipment. In the practice of this invention a plurality of hollow tubes can be woven together to form mats of hollow tubes. For purposes of this disclosure and appended claims the terms mat and cord are used interchangeably. The number of twists of tube per foot in a cord is defined by the distance $\lambda_1$ as illustrated in FIG. 1A. In FIG. 1A two tubes are shown twisted together, however any number of tubes can be twisted together to form a cord. In FIG. 1A the parameter $\lambda_1$ describes the distance from crest to crest or bend to bend of the hollow tube 10 twisted with hollow tube 12. A smaller value of the parameter $\lambda$, for example $\lambda_2$ in FIG. 1B, illustrates a greater number of twists or bends between hollow tubes 14 and 16. More than two hollow tubes can be braided together to form a cord. For braided hollow tubes, as illustrated for individual tubes 18, 20, and 22 in FIG. 1C, a measure of cord tightness is described by the parameter $\lambda_3$. Individual hollow tubes 24, 26, and 28, as shown in FIG. 1D, are more tightly braided and so the parameter $\lambda_4$ is correspondingly smaller than $\lambda_3$. The value of $\lambda$ can range from 1 per foot to 50 per foot with a preferred range of 5-25 crests or bends per foot. The number of hollow tubes twisted or braided together to form a cord can range from 2 to 100, but is more preferably from 2 to 10 hollow tubes.

Figure 2A:
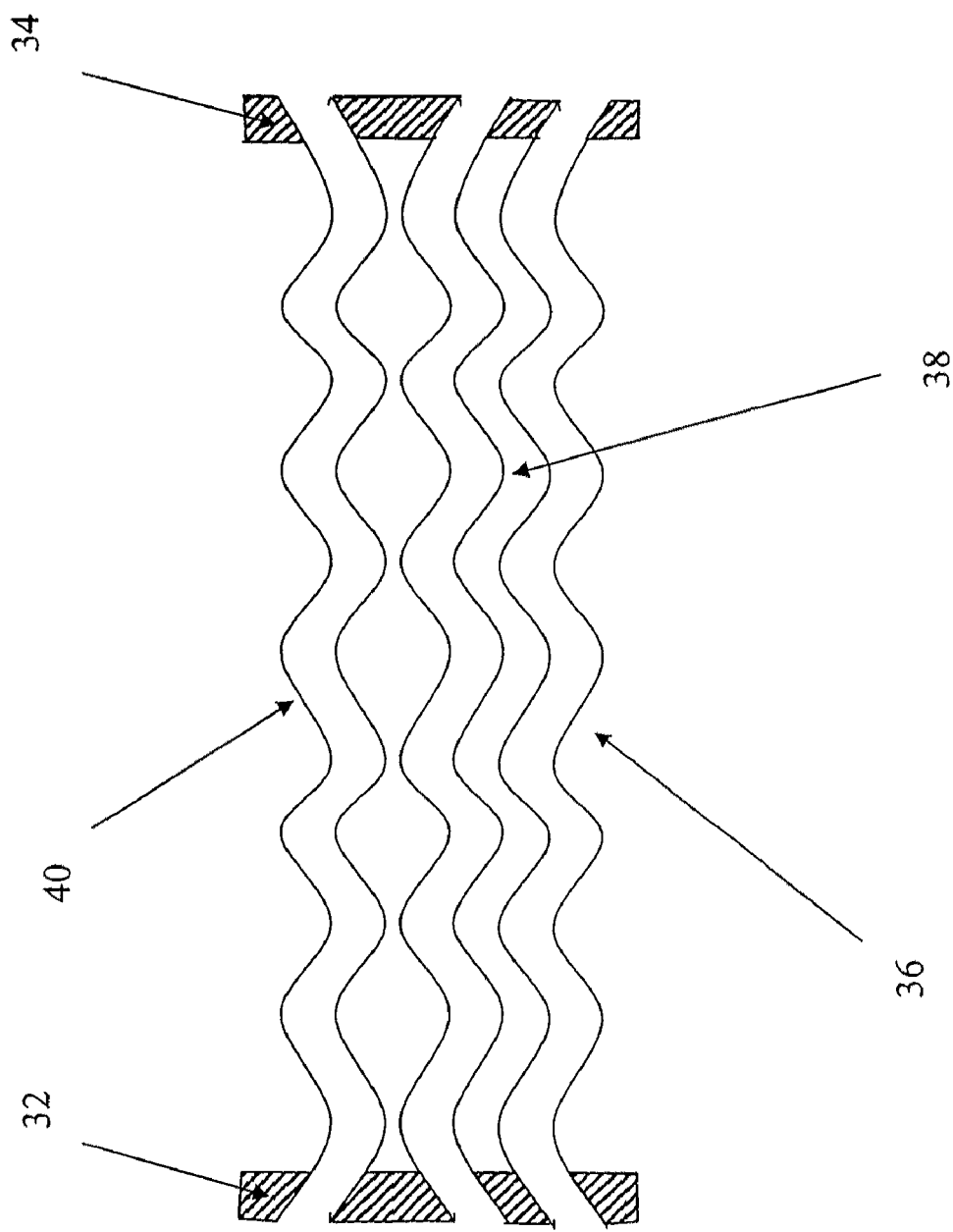
FIG. 2A is a schematic diagram, in cross section, of an exchange apparatus with non-circumferential hollow tubes fused in a thermoplastic resin.
Figure 2B:
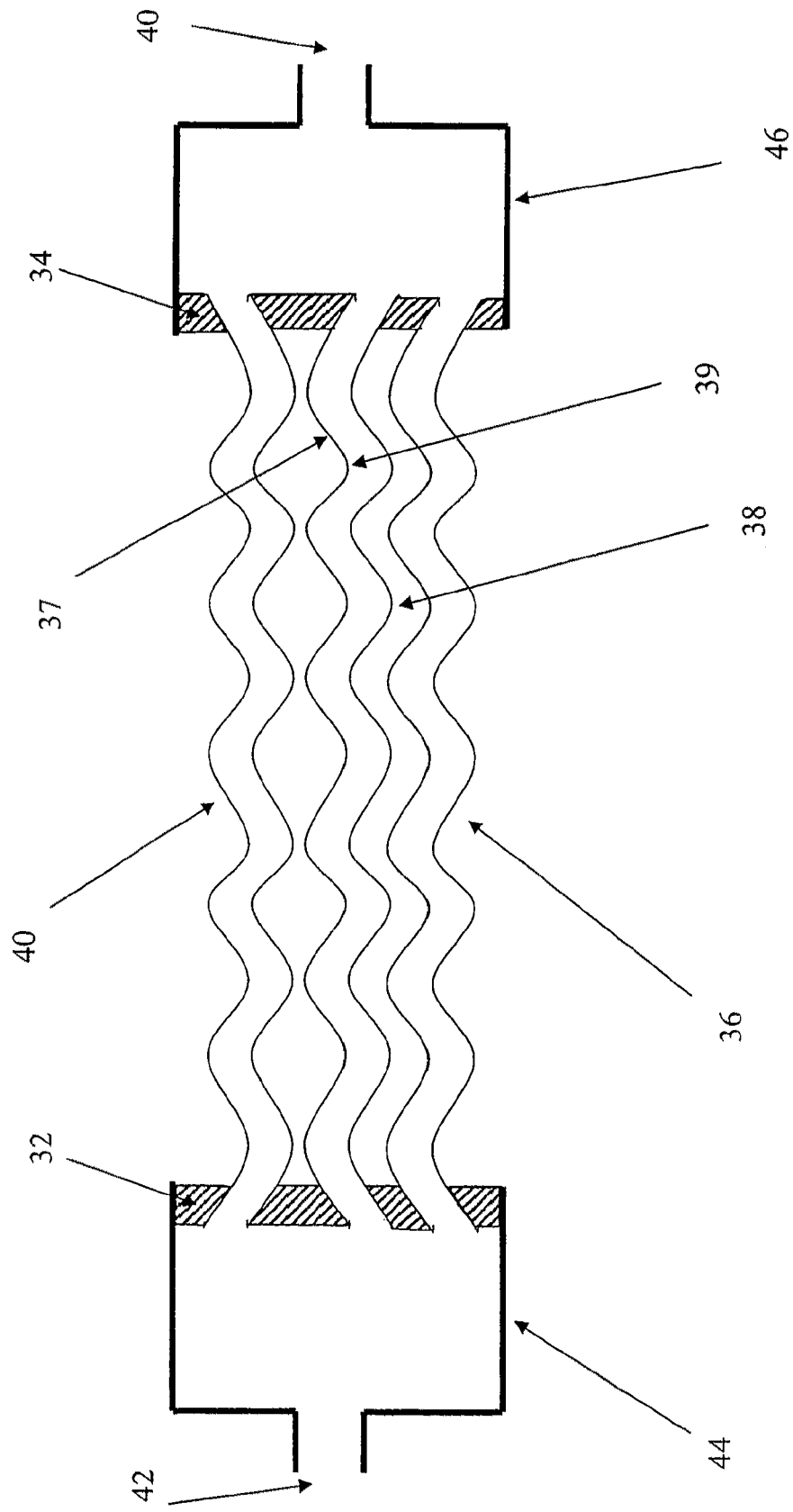
FIG. 2B is a schematic diagram, in cross section, of an exchange apparatus with non-circumferential hollow tubes fused in a thermoplastic resin having fluid inlet and outlet connections.
Figure 2C:
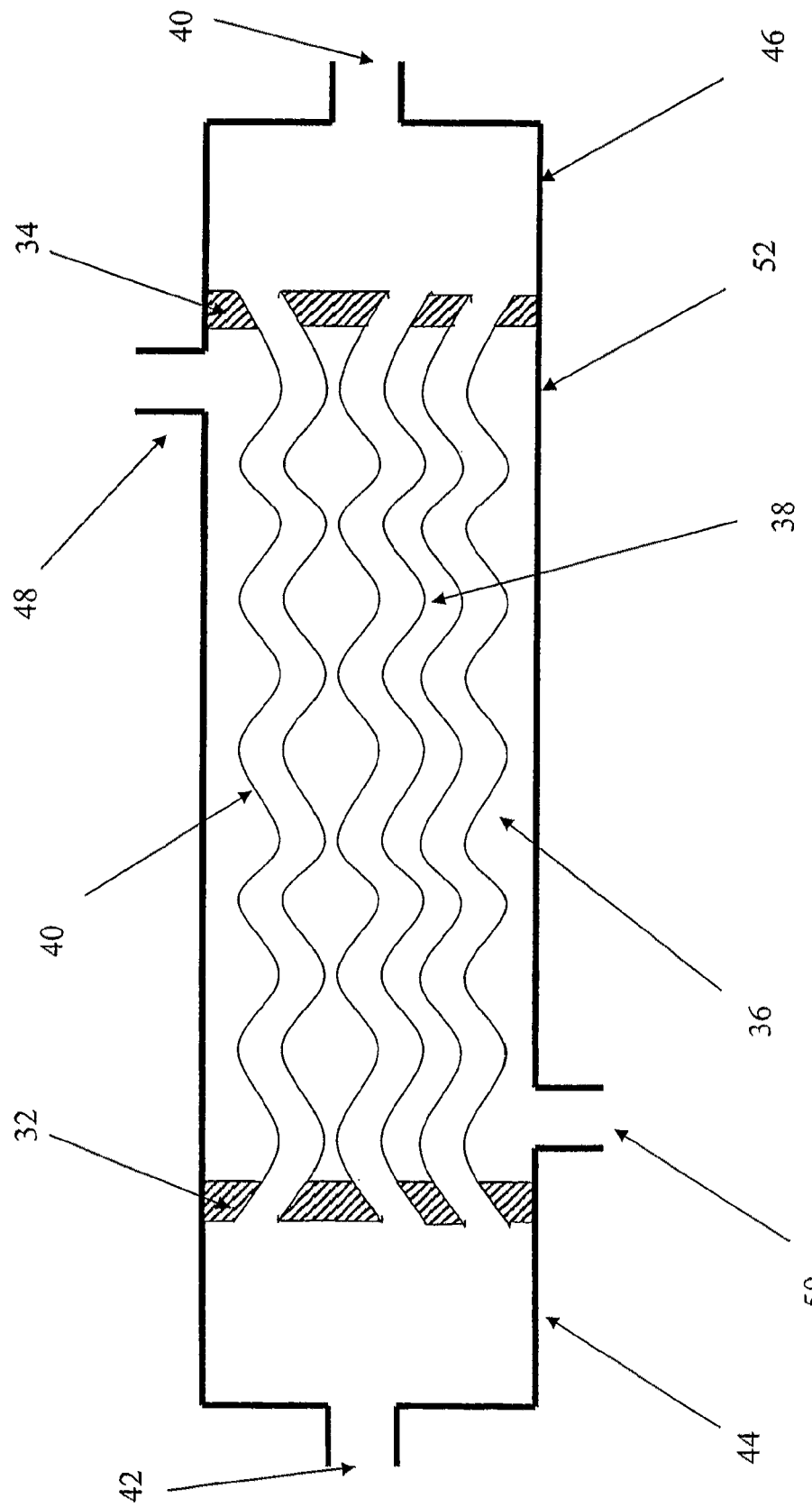
FIG. 2C is a schematic diagram, in cross section, of an exchange apparatus with non-circumferential hollow tubes fused in a thermoplastic resin having fluid inlet and outlet connections and a housing with fluid connections.

The invention is described in more detail with reference to FIG. 2A. As illustrated schematically in FIG. 2A, a portion of each end of individual thermoplastic non-circumferential tubes 36, 38, and 40 are fusion bonded in a fluid tight matter with a thermoplastic resin to form two unitary end or unified terminal end block structures 32 and 34. Any number of thermoplastic hollow tubes can be fused into the thermoplastic resin. FIG. 2B illustrates a cross section of an exchange apparatus further comprising fluid connection ports 40 and 42 bonded to the unified terminal end blocks 34 and 32 with end caps 44 and 46. The end caps and fluid connectors allow a first fluid from a source, not shown, to flow through the hollow tubes 36, 38, and 40. The two sides of the typical hollow tube or hollow fiber 38 of this invention are further characterized by the surfaces 37 and 39. FIG. 2C illustrates a cross section of an exchange apparatus further comprising a housing 52 bonded to unified terminal end blocks 32 and 34 and having one or more fluid connector ports 48 and 50.

Figure 3:
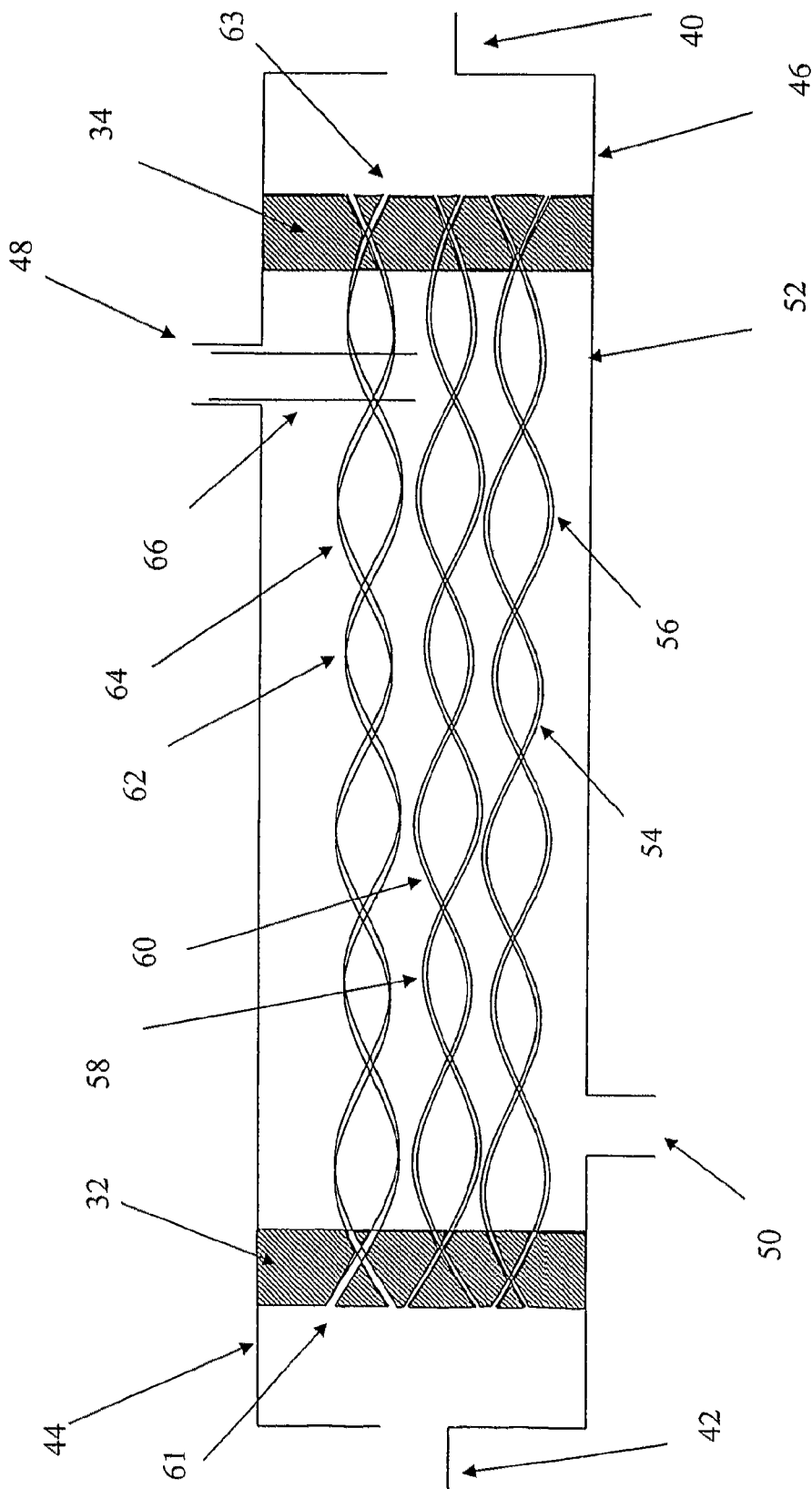
FIG. 3 is a schematic diagram, in cross section, of an exchange apparatus with twisted hollow tubes fused in a thermoplastic resin having fluid inlet and outlet connections and a housing with fluid connections.

In FIG. 3 an embodiment of the exchange apparatus is illustrated further comprising cords of twisted hollow tubes. The cords in this illustration are comprised of hollow tubes 54 and 56, 58 and 60, and 62 and 64. A portion of the ends of each cord are fusion bonded in a fluid tight manner with a thermoplastic resin to form the unified terminal end blocks 32 and 34. The apparatus can have optional housing 52 and end caps 44 and 46 bonded to the unified terminal end blocks. In FIG. 3 at least one fluid flow distributor 66 can optionally be press fit, threaded, or bonded into on or more of the housing fluid connection ports 48 and 50.

Figure 4:
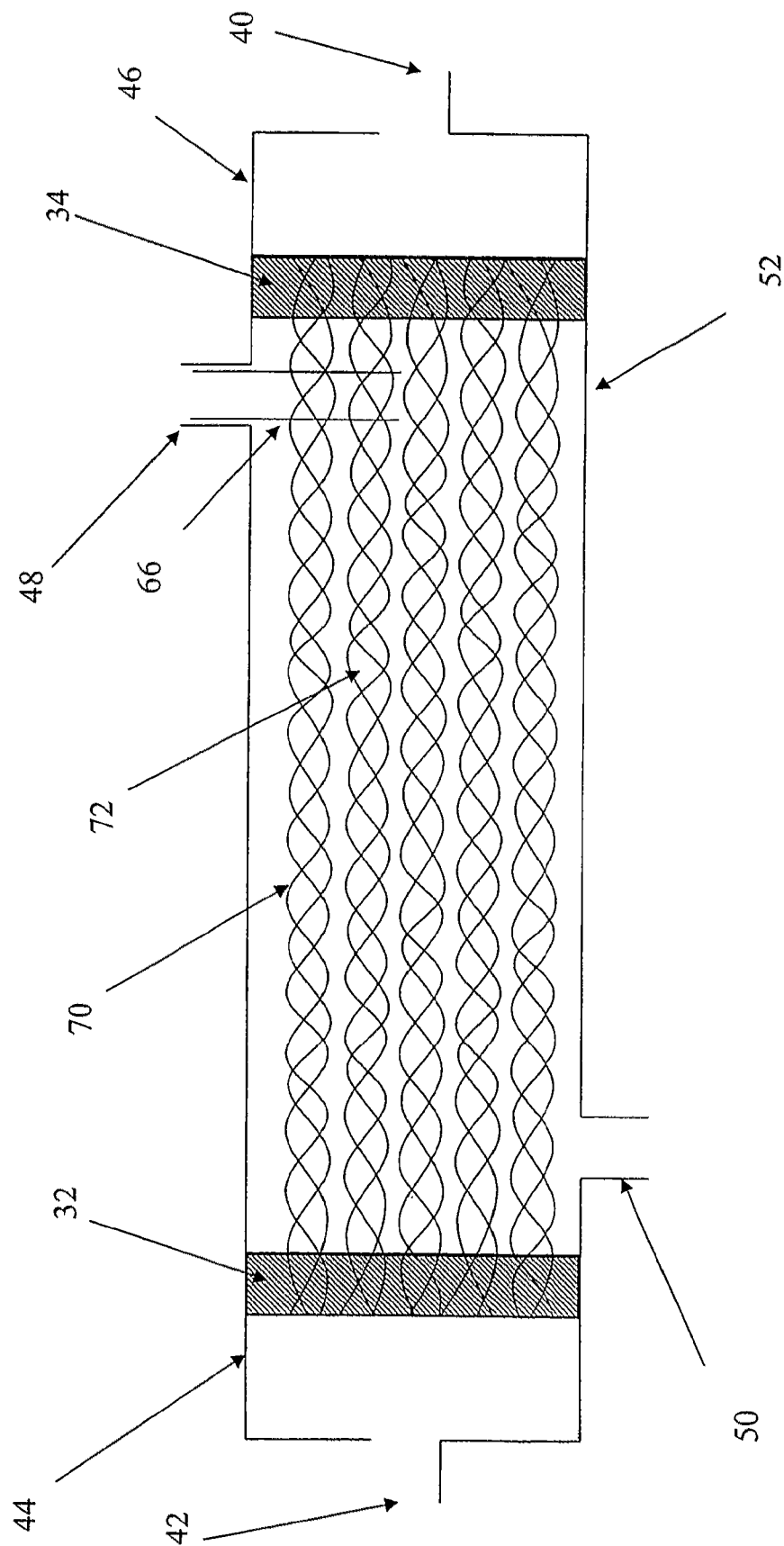
FIG. 4 is a schematic diagram, in cross section, of an exchange apparatus with braided hollow tubes fused in a thermoplastic resin having fluid inlet and outlet connections and a housing with fluid connections.
Figure 5:
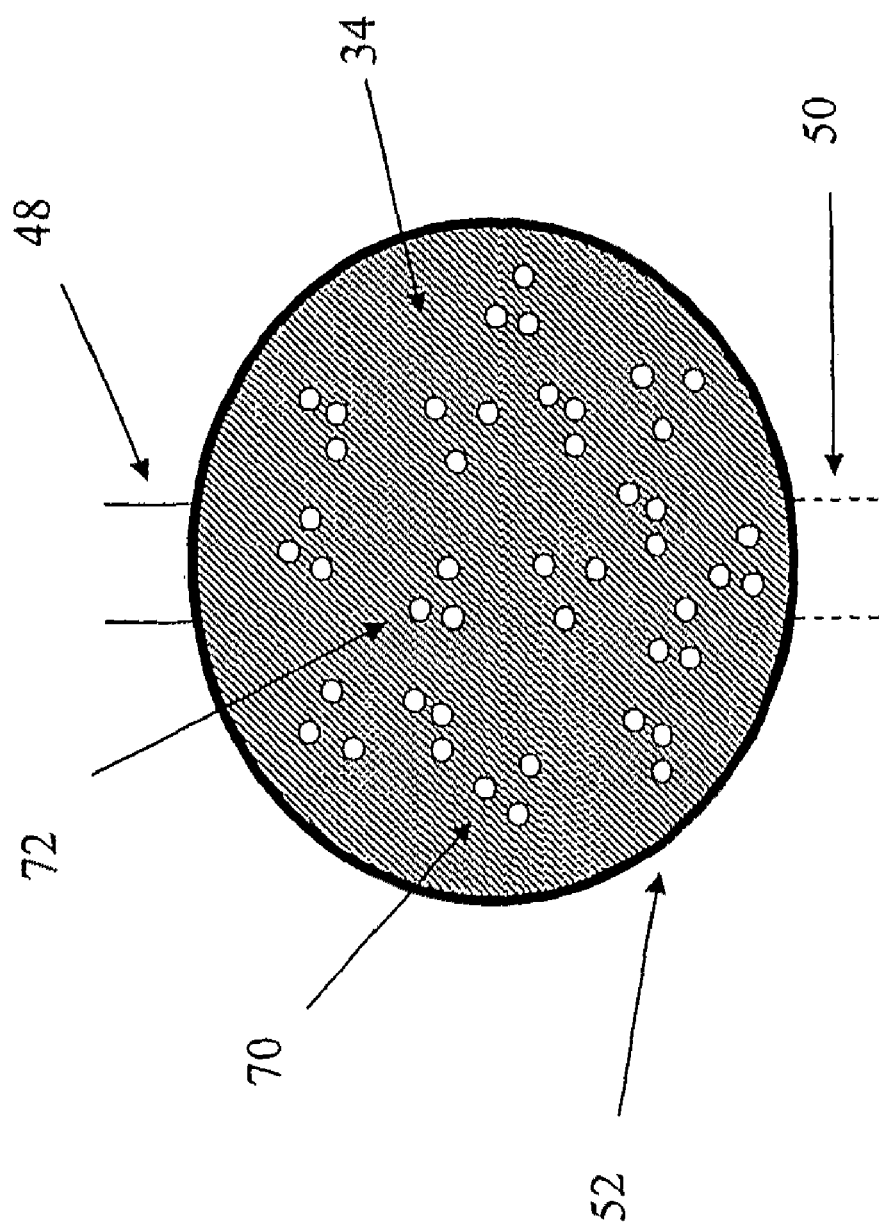
FIG. 5 is a schematic diagram illustrating an end view of an exchange apparatus with braided hollow tubes fused in a thermoplastic resin having fluid inlet and outlet connections and a housing with fluid connections.

In FIG. 4 an embodiment of the exchange apparatus is illustrated further comprising cords of braided hollow tubes. The cords in this illustration are comprised of three or more hollow tubes braided together to form cords illustrated by 70 and 72. The ends of each cord are fusion bonded in a fluid tight manner with a thermoplastic resin to for the unified terminal end blocks 32 and 34. The apparatus can have optional housing 52 and end caps 44 and 46 bonded to the unified terminal end blocks. In FIG. 4 at least one fluid flow distributor 66 can optionally be press fit, threaded, or bonded into on or more of the housing fluid connection ports 48 and 50. An end view of the exchange apparatus shown in FIG. 4 is illustrated schematically in FIG. 5.

With reference to FIG. 3, the operation of one embodiment of the present invention as a heat exchanger will be described. A first fluid enters the exchange apparatus through fluid connection port 42 and enters the hollow tubes at openings 61 in the unified terminal end block 32. Fluid flows through the interior or lumen of the hollow tubes and exits the tubes through the unified end block 34 at exit openings 63. The first fluid exits the exchange apparatus through fluid connection port 40. A second fluid enters the exchange apparatus through housing fluid port 48 and optional flow distributor 66. The first fluid is separated from a second fluid by the two surfaces and wall of the hollow tube. The second fluid enters the housing through connection 48 and substantially fills the space between the inner wall of the housing and the outer diameters of the fibers. Energy is transferred between the first and second fluids through the thermoplastic hollow tube walls. The second fluid exits the housing through the fluid connector port 50. Examples of fluids include liquids, vapors of liquids, gases, and super critical fluids.

Manufacturers produce membranes from a variety of materials, the most general class being synthetic polymers. An important class of synthetic polymers are thermoplastic polymers, which can be flowed and molded when heated and recover their original solid properties when cooled. As the conditions of the application to which a tube or membrane is being used become more severe, the materials that can be used becomes limited. For example, the organic solvent based solutions used for wafer coating in the microelectronics industry will dissolve or swell and weaken some polymeric tubes and membranes. The high temperature stripping baths in the same industry consist of highly acid and oxidative compounds, which will destroy membranes and tubes made of common polymers.

Hollow tubes made from thermoplastics with outside diameters ranging from 0.007 to 0.5 inches, and more preferably 0.025 to 0.1 inches in diameter, and wall thickness ranging from 0.001 to 0.1 inches, preferably 0.003 to 0.05 inches in thickness, are useful in the practice of this invention. The tubes can be used individually, or the tubes can be combined by braiding, plaiting, or twisting them to form cords comprised of multiple hollow tubes.

Examples of perfluorinated thermoplastics or their blends which are useful in the practice of this invention include but are not limited to [Polytetrafluoroethylene-co-perfluoromethylvinylether], (MFA), [Polytetrafluoroethylene-co-perfluoropropylvinylether], (PFA), [Polytetrafluoroethylene-co-hexafluoropropylene], (FEP), and [polyvinylidene fluoride], (PVDF). Both PFA Teflon® and FEP Teflon® thermoplastics are manufactured by DuPont, Wilmington, Del. Neoflon® PFA is a polymer available from Daikin Industries. MFA Haflon® is a polymer available from Ausimont USA Inc. Thorofare, N.J. Preformed MFA Haflon® and FEP Teflon® tubes are available from Zeus Industrial Products Inc. Orangebury, S.C. Other thermoplastics or their blends which are useful in the practice of this invention include but not limited to poly(chlorotrifluoroethylene vinylidene fluoride), polyvinylchloride, polyolefins like polypropylene, polyethylene, polymethylpentene, ultra high molecular weight polyethylene, polyamides, polysulfones, polyetheretherketones, and polycarbonates.

Hollow thermoplastic tubes can be impregnated with thermally conductive powders or fibers to increase their thermal conductance. Examples of useful thermally conductive materials include but are not limited to glass fibers, metal nitride fibers, silicon and metal carbide fibers, or graphite. The thermal conductivity of the hollow thermoplastic tubes or impregnated thermoplastic hollow tubes useful in this invention is greater than about 0.05 watts per meter per degree Kelvin.

Hollow tubes useful in the practice of this invention for particle filtration and mass transfer applications such as gas contacting, liquid degassing, and pervaporation include hollow fiber membranes. Suitable membranes include hollow fibers made from [Polytetrafluoroethylene-co-perfluoropropylvinylether], (PFA), or ultra high molecular weight polyethylene, both available from Mykrolis Corporation, Billerica, Mass.

In a preferred embodiment the twisted, plaited, or braided tube form a continuous cord. The cord can be wound around a rectangular metal frame, as described in WO 00/44479, the distance between parallel sides defining the length of the exchange device. The coiled cord on the metal frame is placed in an oven below the melting point of the hollow tubes. The tubes are thermally annealed at a temperature below their melting point and then cooled to set the crests or bends in the braided, plaited, or twisted tubes into the cord. Annealing of the cord tubes occurs below the melting point at a temperature usually less than 250 degrees Celsius, more preferably from 100 to 200 degrees Celsius, and for a time ranging from 15 to 60 minutes, and more preferably for 30 minutes. In an alternative embodiment the twisted, plaited, or braided tubes can be annealed on a spool.

In another embodiment the braided or twisted tubes can be thermally annealed in a first step and then the individual tubes separated from each other after cooling to form self supporting helical shaped or non-circumferential shaped single tubes. Thermal annealing sets the crests and bends of the hollow tube so that the individual hollow tubes or cords can be separated and handled without straightening.

In one embodiment of the present invention, the thermally annealed and set cords of hollow tubes can be joined by the method described in U.S. Pat. No. 3,315,750 included herein by reference in its entirety. The cords can also be joined to each other and to the housing by the injection molding method described in European Patent Application 0 559 149 A1 included herein by reference in its entirety. In a preferred embodiment, the method described in U.S. patent application 60/117,853, filed Jan. 29, 1999 and WO 00/44479, and incorporated herein in its entirety by reference is useful in the practice of the current invention.

Figure 7B:
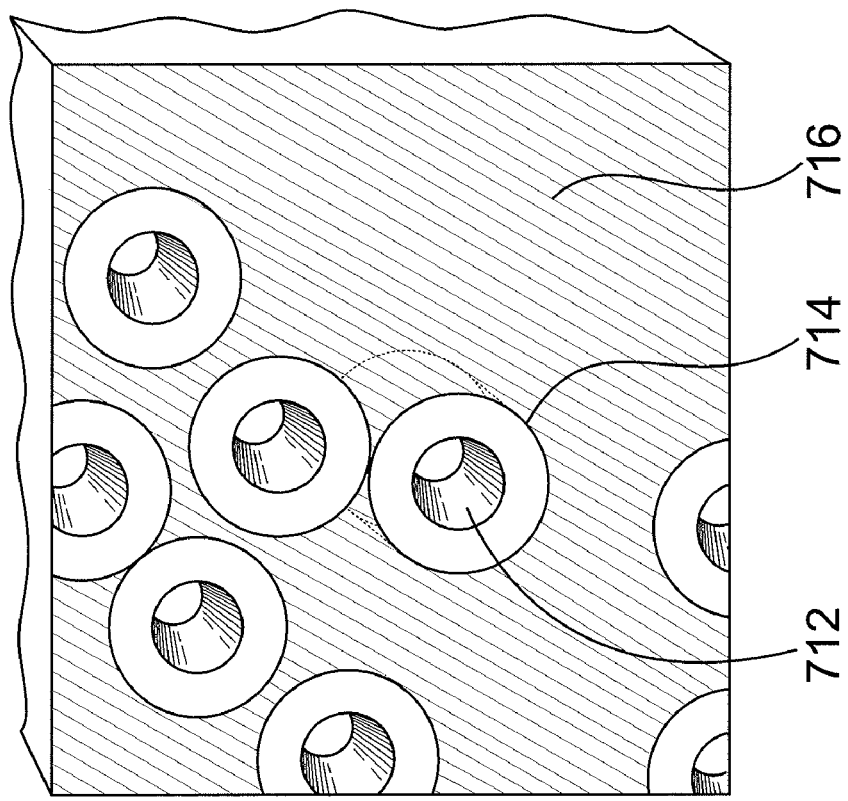
FIG. 7B is an illustration of un-fused hollow tube ends and a thermoplastic resin.
Figure 7A:
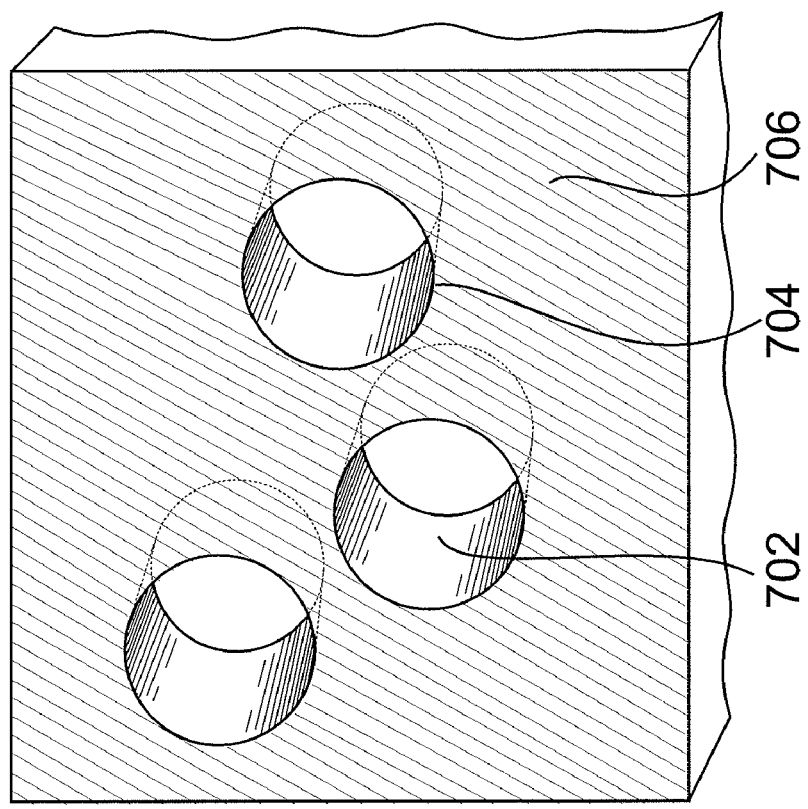
FIG. 7A is an illustration of hollow tube ends fusion bonded into a thermoplastic resin using the method of this invention.

The term unified terminal end block or unitary end structure in the practice of this invention is meant to describe a mass or well of a thermoplastic resin into which one or more hollow tubes or cords have been bonded or fusion bonded. FIG. 7 illustrates an example of hollow tubes fusion bonded to a thermoplastic resin to form a unified terminal end block structure and hollow tubes not fusion bonded to a thermoplastic resin. FIG. 7A is a non-limiting illustration of a cut-away of three hollow tubes fusion bonded into a thermoplastic resin 706 in an embodiment of this invention. In FIG. 7A the inner wall surface 702 of the hollow tubes is visible and an edge 704 of the inner wall surface 702 is visible; the wall of the hollow tubes is fused with the resin 706. FIG. 7B is an illustration of a cut-away of all or part of eight hollow tubes that are unfused with a thermoplastic resin 716. In FIG. 7B, the inner wall surface 712 of the hollow tubes and the edge 714 of outer wall of the tubes are visible illustrating that the hollow tubes are un-fused with the thermoplastic resin 716. U.S. patent application No. 60/117,853 describes a hollow fiber bonded to a thermoplastic resin. Optionally thermoplastic end caps having fluid connector ports or a thermoplastic housing may be fusion bonded to the one or more of the unified terminal end blocks. For purposes of illustrating the present invention, a unified terminal end block comprising hollow tubes, a thermoplastic resin, and a thermoplastic housing is described. The housing to form a single entity consisting solely of perfluorinated thermoplastic materials is prepared by first pretreating the surfaces of both ends of the housing before the potting and bonding step. A unified terminal end block end structure, by which is meant that the braided or twisted tubes and the potting are bonded to the housing to form a single entity consisting solely of perfluorinated thermoplastic materials is prepared by first pretreating the surfaces of both ends of the housing before the potting and bonding step. This is accomplished by melt-bonding the potting material to the housing. The internal surfaces on both ends of the housing are heated close to their melting point or just at the melting point and immediately immersed into a cup containing powdered [Polytetrafluoroethylene-co-perfluoromethylvinylether]

thermoplastic potting resin available from Ausimont USA Inc. Thorofare, NJ. Since the surface temperature of the housing is higher than the melting point of the potting resins, the potting resin is then fused to the thermoplastic housing. The housing is then taken out and polished with a heat gun to fuse any excess un-melted thermoplastic powder. It is preferred that each end of the tube be treated at least twice with this pre-treatment.

The annealed twisted hollow tube cords are inserted into a poly(tetrafluoroethylene-co-perfluoro(alkyvinylether)), Teflon® PFA, or MFA shell tube. The shell tube optionally has fluid fittings fusion bonded to its surface to form an inlet and an outlet ports. The packing density of the tube cords within the shell tube should be in the range of from 3-99 percent by volume, and more preferably 20-60 percent by volume.

Potting and bonding of the tube cords into the housing can be done in a single step. The preferred thermoplastic resin potting material is Hyflon® MFA 940 AX resin, available from Ausimont USA Inc. Thorofare, N.J. The method comprises vertically placing a portion of a bundle of the annealed and twisted hollow tube cord lengths with at least one closed end into a temporary recess made in a pool of molten thermoplastic polymer held in a container. The hollow tubes are held in a defined vertical position, maintaining the thermoplastic polymer in a molten state so that it flows into the temporary recess, around the hollow tubes and vertical up the fibers, completely filling the interstitial spaces between fibers with the thermoplastic polymer. A temporary recess is a recess that remains as a recess in the molten potting material for a time sufficient to position and fix the bundle of hollow tubes in place and then will be filled by the molten thermoplastic. The temporary nature of the recess can be controlled by the temperature at which the potting material is held, the temperature at which the potting material is held during hollow tube bundle placement, and the physical properties of the potting material. The end of the hollow tube can be closed by sealing, plugging, or in a preferred embodiment, by being formed in a loop.

Once the first end of the device has been potted and fused into a unified terminal end block comprising the hollow tubes, housing and thermoplastic resin, the second end of the device is potted. The process involves heating the potting resins in a heating cup with an external heating block or other heat source at a temperature in the range of from about 265 C to around 285 C, with a preferred range of from about 270 C to around 280 C, until the melt turns clear and is free of trapped bubbles. A rod is inserted into the melt to create a recess or cavity. The housing and the hollow tube bundle are then inserted into the cavity. It is important to note that at this point neither the hollow tube bundle nor the housing touches the potting resin. The melted resin will flow by gravity to fill the voids over time to pot the hollow tubes and bond to the housing simultaneously. After the potted ends are cooled, they are then cut and the lumen of the hollow tubes exposed. The potted surfaces are then polished further using a heat gun to melt away any smeared or rough potted surfaces. For module with a large number of hollow tubes, such as 2000 or more, it is possible that the module may potting defects which can be repaired using a clean soldering iron to fuse and close the damaged areas.

Another embodiment of this invention is useful for potting helical cords composed of hollow tubes. Each end of the twisted or braided hollow tubes are potted in a metal mold in a first step. The mold is slightly smaller than the inner diameter of the shell tube and can be made from aluminum or nickel or similar alloys. After potting and cooling, the mold is removed. The ends of the hollow tubes in the unified terminal end blocks are opened by cutting as described above. After both ends of the hollow tubes have been potted, the formed unified terminal end block structures are inserted into a pre-treated MFA or PFA shell housing tube, or end caps, and the unified terminal end block fused to the housing tube or end caps in a short heating process.

In a preferred embodiment of this invention illustrated in FIG. 3, at least one thermoplastic tube 66 is inserted into at least one of the fluid fittings 48 on the shell side of the exchange apparatus. It is preferred that the tube be placed into a portion of the tube bundle nearest the fitting. The tube can be thermally bonded to the housing or press fit into the shell fittings. The tube provides for improved flow distribution of fluid in the device.

Fluid fitting useful for connecting the apparatus of this invention to sources of working and process fluid include but are not limited to Flaretek®, Pillar®, Swagelock®, VCO®, standard pipe thread fittings, or barb fittings. In a preferred embodiment two fluid connections are provided for the process fluid; one inlet connection for flow of fluid into the apparatus and one outlet connection for flow of fluid out from the apparatus. The process fluid may flow through the tubes or across the outside of the tubes. The inlet and outlet connections for the process fluid may be bonded to the unified terminal end blocks by welding, threading, flanging, or fusion bonding to the thermoplastic. If a housing is provided for the exchange apparatus, the inlet connections for the process fluid may be bonded to the housing and or unified terminal end block by welding, threading, or flanging. In a preferred embodiment the connections are fusion bonded to the housing and or the unified terminal end block. One or more fluid connections may be provided for flow of working fluid through the housing or for flow of filtered liquid out of the housing. The one or more connections for flow of working fluid or filtered fluid through the housing may be bonded to the housing by welding, threading, or flanging to the housing. In a preferred embodiment the connections are fusion bonded to the housing.

General Procedure 1

Preformed hollow MFA tube tubes with 0.047 inch inside diameter and 0.006 inch thick wall thickness were obtained from Zeus Industrial Products Inc. Orangebury, S.C. Cords for potting were made by hand twisting pairs of these hollow MFA tubes to obtain about 12 turns per foot of cord. A single cord was wrapped around a metal frame 8 inches wide and 18-27 inched long; it was possible to make about 75 wraps of the cord on the metal frame. The frame and wrapped cords were annealed in an oven for 30 minutes at 150 degrees Celsius. About 75 loops of cord each measuring 18-27 inches in length were obtained from the rack after annealing. Cord from a single rack or from multiple racks were gathered and placed into a previously heat treated and MFA coated PFA tube measuring 16-25 inches in length. The inside diameter of the tubes was 1-2.25 inch and ¼" FlareTek® fluid fittings were bonded approximately 2 inches from each end of the PFA tube. Each end of the device was potted using Hyflon® MFA 940 AX resin, obtained from Ausimont USA Inc. Thorofare, N.J., for about 40 hours at 275° C. Cool down of each end after 40 hours of potting was controlled to a rate of 0.2 C.°/min to 150 C.°. The unified terminal block ends were cleared of resin and the hollow tubes opened by machining the end portion of the potted device using a lathe or knife.

Fluid fittings for the potted exchanger were made by scoring a pipe thread onto each end of the tube or by thermally fusing an end cap onto the tube.

EXAMPLE 1

A prototype heat exchanger having a housing with a 1 inch inside diameter PFA tube was prepared by Procedure 1 except that the tubes were not twisted or annealed. The device contained 150 tubes of straight MFA tube measuring 15 inches in length.

The prototypes was tested under the following conditions. Hot water at a temperature of 63° C. was fed into the tube side of the device at a flow rate of approximately 1750 ml/min. Cold water at a temperature of 19° C. was fed into the shell side of the device at a flow rate of approximately 1070 ml/min. The hot and cold water paths flowed countercurrent to one another. The inlet and outlet temperatures and the flow rates were recorded every five minutes for the tube and shell side fluid streams for one hour. The results from this experiment are detailed in Table 1 shown in FIG. 6. Under these conditions the cold water was heated from 18.9° C. to 38.8° C. and a total of 1486 watts of energy was exchanged between the two fluids.

EXAMPLE 2

A prototype heat exchange apparatus having a housing with a 1 inch inside diameter PFA tube was prepared by Procedure 1 except that it contained about 150 hollow MFA tubes twisted together with about 12 twists per foot. The twisted cords were annealed on a metal rack to yield approximately 75 cords measuring about 15 inches in length.

The prototype was tested under the following conditions. Hot water at a temperature of 55° C. was fed into the tube side of the device at a flow rate of approximately 1650 ml/min. Cold water at a temperature of 19° C. was fed into the shell side of the device at a flow rate of approximately 1070 ml/min. The hot and cold water paths flowed countercurrent to one another. The inlet and outlet temperatures and the flow rates were recorded every five minutes for the tube and shell side fluid streams for one hour. The results from this experiment are detailed in Table 1 in FIG. 6. Under these conditions the cold water was heated to from 18.9° C. to 44.0° C. and a total of 1874 watts of energy was exchanged between the two fluids.

EXAMPLE 3

This prospective example shows how a wafer processing tool including the exchange apparatus of this invention can be used to heat liquids used for cleaning semiconductor wafers.

An exchange apparatus having about 650 twisted hollow MFA tubes, 325 pairs, can be thermally annealed and fusion bonded in a 2 inch inside diameter PFA tube using the methods of Procedure 1. The length of the device can be about 18 inches and has a liquid volume of about 300 milliliters. The device is part of a wafer processing tool and is connected at its inlet fluid connection to an in-line to a source of aqueous 10% hydrochloric acid containing about 1 percent by volume hydrogen peroxide. The outlet of the exchange device is connected to a valve, optional stop suck back valve, and nozzle for dispensing the aqueous acid solution onto a substrate to be cleaned. One of the fluid inlet connections on the shell side of the exchange device is connected in-line to a source of hot water. Hot deionized water is commonly available in a semiconductor factory at a temperature of about 75 degrees Celsius. The heated water passing through the shell side of the exchange device heats the acid solution contained within the tubes of the exchange apparatus. After a variable time of no fluid flow, the valve at the outlet of the exchange device is opened and heated aqueous acid and oxidant is dispensed onto the wafer where it is used to clean the wafer. The valve is closed and liquid acid and oxidant flows into the hollow tubes of the exchange apparatus where it is heated for the next dispense.

EXAMPLE 4

This prospective example shows how an exchanger for cross flow filtration may be made utilizing thermally annealed, plaited, porous hollow PFA tubes.

A prototype filtration device having a housing with a 1 inch diameter PFA tube was prepared by Procedure 1 except that 150 hollow porous PFA fibers having a 550 micron outside diameter, available from Mykrolis Corporation, Billericia, Mass., are substituted for the non porous hollow MFA tubes. The hollow fibers can be plaited 3 per strand and can be wound on a rack measuring 15 inches in length. The plaited and wound hollow fibers can be thermally annealed at about 150 Celsius to set the plait and length of the hollow fibers. The thermally annealed and plaited hollow fibers are assembled into an apparatus according to the method disclosed in WO 0044479.

The housing for this device contains inlet and outlet port connections for flow of a fluid containing insoluble suspended materials like colloids, gels, or hard particles. Examples of fluids containing suspended solid particles include alumina in a chemical mechanical polishing slurries, examples of colloids in fluids can include silica. The fluid containing the insoluble suspended material flows through the insides of the porous hollow fiber tubes. The housing has a single fluid flow port connection for flow of filtered liquid away from the housing. A portion of the liquid containing the suspended solids flows across the plaited porous hollow tubes; some of the solids are retained by the porous membrane and a portion of filtered liquid flows through the membrane and out of the fluid port on the housing.

EXAMPLE 5

This prospective example shows how an exchange apparatus for mass transfer of a gas into a liquid may be made utilizing thermally annealed, plaited, porous hollow PFA tubes.

A prototype filtration device having a housing with a 1 inch diameter PFA tube can be prepared by Procedure 1 except that 150 hollow porous PFA fibers having a 550 micron outside diameter, available from Mykrolis Corporation, Billericia, Mass., are substituted for the 150 hollow MFA tubes. The hollow fibers can be plaited 3 per strand and can be wound on a rack measuring 15 inches in length. The plaited and wound hollow fibers can be thermally annealed at about 150 C. to set the plait and length of the tubes. The thermally annealed and plaited hollow fibers can be assembled into an apparatus according to the method disclosed in WO 0044479.

The housing for this device can have inlet and outlet port connections for flow of deionized water through the insides of the porous hollow fiber tubes. One of the housing's two ports can be used for connection to a source of ozone gas generated by an ozone generator, for example Astex 8400 ozone generator available from Astex, Woburn, Mass. The ozone gas dissolves in the water by permeating through the porous plaited hollow PFA tubes. Excess ozone gas is vented through the housing's second port. Water exiting the insides of the tubes contains ozone gas dissolved in the water. This ozonated water is useful for cleaning wafers using a modified RCA cleaning processes.

EXAMPLE 6

This example illustrates a heat exchange apparatus of this invention with twenty thin walled hollow PFA tubes. The device was used to heat flowing water in-line.

A 0.5 inch OD PFA tube of length 17 inches was used as a housing conduit. The housing conduit had inlet and outlet ports. The housing conduit was fusion bonded using PFA potting material at each end to twenty six 1.05 mm ID PFA tubes with wall thickness 0.15 mm. Two J-type thermocouples were positioned in separate flow through housings. One thermocouple was connected to the inlet port of the exchange apparatus housing conduit and the second thermocouple was connected to the outlet port of the heater device housing conduit. In operation process water flows through the inlet thermocouple housing, into the exchanger apparatus housing, and through the hollow tubes. Working or exchange fluid passed through an inlet thermocouple housing and into the shell side of the housing in a counter current fashion where it contacted the outsides of the hollow tubes. The exchange or working fluid then passes through the outlet port on the shell side of the housing conduit and through a second outlet thermocouple housing. Process water flowing through the exchange apparatus tubes exits the tubes through a second outlet thermocouple housing. With a flow rate of 1000 milliliters per minute of water at a temperature of about 16 degrees Celsius flowing into the shell side of the device, water flowing into the tubes at a temperature of 55.5 degrees Celsius and a flow rate of 260 milliliters per minute was cooled to 33.1° C. on exiting the tubes. The performance of this apparatus at different tube side flow rates is summarized in FIG. 8.

EXAMPLE 7

This example illustrates a heat exchange apparatus of this invention with 680 thin walled hollow MFA tubes. The device was used to cool flowing water in-line.

A prototype heat exchange apparatus having a PFA housing with a 2.25 inch inside diameter 32 inch length was prepared by Procedure 1 except that it contained about 680 hollow MFA tubes twisted together with about 12 twists per foot. The twisted cords were annealed on a metal rack to yield cords measuring about 34 inches in length. Inlet fluid fittings on the housing shell side were ½" Flaretek®; they were 27 inches apart and 2.5 inches from the ends of the device. The housing fluid fittings for tube side flow were ¾" Flaretek® and were fusion bonded to the housing tube.

The prototype was tested under the following conditions. Hot water at a temperature of 70.1° C. was fed into the tube side of the device at a flow rate of approximately 4.4 liters per minute. Cold water at a temperature of 14.5° C. was fed into the shell side of the device at a flow rate of approximately 6.6 liters per minute. The hot and cold water paths flowed countercurrent to one another. The inlet and outlet temperatures and the flow rates were recorded using an Agilent data logger. The results from this experiment are detailed in the Table in FIG. 9. Under these conditions the hot water in the tubes was cooled from 70.1° C. to 22.9° C. and a total of 14,400 watts of energy was exchanged between the two fluids. The performance of this apparatus at other flow rates is summarized in FIG. 9.

What is claimed:

1. An exchange apparatus comprising:
    a perfluorinated thermoplastic housing;
    cords of two or more non-porous perfluorinated thermoplastic hollow tubes, said cords having a shape set by thermal annealing, the non-porous perfluorinated hollow tubes in said cords having a first end portion and a second end portion and hollows passing therebetween;
    the first end portions of said non-porous perfluorinated thermoplastic hollow tubes being fusion bonded at least at a periphery of said non-porous perfluorinated thermoplastic hollow tubes through a perfluorinated thermoplastic resin to form a first unified terminal end block in which the end portions of said non-porous perfluorinated thermoplastic hollow tubes are fluid tightly bonded together in a fused fashion with the perfluorinated thermoplastic resin; said second end portions of said non-porous perfluorinated thermoplastic hollow tubes being fusion bonded at least at a periphery of said non-porous perfluorinated thermoplastic hollow tubes through a perfluorinated thermoplastic resin to form a second unified terminal end block in which the end portions of said non-porous perfluorinated thermoplastic hollow tubes are fluid tightly bonded together in a fused fashion with the perfluorinated thermoplastic resin;
    said first unified terminal end block and said second unified terminal end block having through hole communication with the hollows of the unbonded portions of said non-porous perfluorinated thermoplastic hollow tubes;
    said first unified terminal end block having a first fluid inlet connection to supply a first fluid to said non-porous perfluorinated thermoplastic hollow tubes and said second unified terminal end block having a first fluid outlet connection to remove said first fluid from said non-porous perfluorinated thermoplastic hollow tubes;
    said perfluorinated thermoplastic housing fusion bonded with said perfluorinated thermoplastic resin to form a single entity of fusion bonded perfluorinated thermoplastic materials;
    said perfluorinated thermoplastic housing having a first housing port wherein a second fluid enters the exchange apparatus and a second housing port wherein said second fluid exits the housing.

2. The apparatus of claim 1, wherein a packing density of said non-porous perfluorinated thermoplastic hollow tubes ranges from 20 to 60 percent by volume.

3. The apparatus of claim 1, wherein said non-porous perfluorinated thermoplastic hollow tubes are comprised of a thermoplastic or a blend thereof chosen from the group consisting of polytetrafluoroethylene-co-perfluoromethylvinylether, polytetrafluoroethylene-co-perfluoropropylvinylether, polytetrafluoroethylene-co-hexafluoropropylene, and polyvinylidine fluoride.

4. The apparatus of claim 1 wherein said non-porous perfluorinated thermoplastic hollow tubes are impregnated with a thermally conductive material.

5. A method comprising:
    flowing a first fluid on a first side of cords of two or more non-porous perfluorinated thermoplastic hollow tubes in a heat exchange apparatus, said heat exchange apparatus comprising cords having a shape set by thermal annealing, the non-porous perfluorinated hollow tubes in said cords having a first end portion and a second end portion and hollows passing therebetween; the first end portions of said non-porous perfluorinated thermoplastic hollow tubes being fusion bonded at least at a periphery of said non-porous perfluorinated thermoplastic hollow tubes through a perfluorinated thermoplastic resin to form a first unified terminal end block in which the end portions of said non-porous perfluorinated thermoplastic hollow tubes are fluid tightly bonded together in a fused fashion with the perfluorinated thermoplastic resin; said second end portions of said non-porous perfluorinated thermoplastic hollow tubes being fusion bonded at least at a periphery of said non-porous perfluorinated thermoplastic hollow tubes through a perfluorinated thermoplastic resin to form a second unified terminal end block in which the end portions of said non-porous perfluorinated thermoplastic hollow tubes are fluid tightly bonded together in a fused fashion with the perfluorinated thermoplastic resin; said first unified terminal end block and said second unified terminal end block having through hole communication with the hollows of the unbonded portions of said non-porous perfluorinated thermoplastic hollow tubes;

said first unified terminal end block having a first fluid inlet connection to supply said first fluid to said first side of said non-porous perfluorinated thermoplastic hollow tubes and said second unified terminal end block having a first fluid outlet connection to remove said first fluid from said first side of said non-porous perfluorinated thermoplastic hollow tubes;

a perfluorinated thermoplastic housing fusion bonded by said perfluorinated thermoplastic resin to form a single entity of fusion bonded perfluorinated thermoplastic materials;

flowing a second fluid on a second side of said non-porous perfluorinated thermoplastic hollow tubes; said perfluorinated thermoplastic housing having first housing port wherein said second fluid enters the exchange apparatus and a second housing port wherein said second fluid exits the housing; and transferring energy between said first fluid and said second fluid through the wall of the non-porous perfluorinated thermoplastic hollow tubes.

6. The method of claim 5 wherein said first fluid is a photoresist, an antireflective coating, a resist stripper, or a photoresist developer.

7. The method of claim 5 wherein said first fluid is a liquid spin on dielectric.

8. The method of claim 5 wherein said first fluid is a fluid comprising copper ions.

9. The method of claim 5 wherein said first fluid is chosen from the group consisting of an acid, a base, an oxidizer, and mixtures thereof.

10. The method of claim 5 wherein said first fluid is an organic liquid.

11. The method claim 5 wherein said second fluid is chosen from the group consisting of an inert gas, water, polyethylene glycol compositions, and steam.

* * * * *